(12) United States Patent
Colbachini

(10) Patent No.: US 10,683,956 B2
(45) Date of Patent: Jun. 16, 2020

(54) CONNECTION DEVICE FOR PIPES IN GENERAL

(71) Applicant: IVG COLBACHINI S.p.A., Cervarese Santa Croce (PD) (IT)

(72) Inventor: Giuseppe Aldinio Colbachini, Cervarese Santa Croce (IT)

(73) Assignee: IVG COLBACHINI S.P.A., Cervarese Santa Croce (PD) (IT)

( * ) Notice: Subject to any disclaimer, the term of this patent is extended or adjusted under 35 U.S.C. 154(b) by 146 days.

(21) Appl. No.: 15/787,577

(22) Filed: Oct. 18, 2017

(65) Prior Publication Data
US 2018/0106408 A1   Apr. 19, 2018

(30) Foreign Application Priority Data
Oct. 18, 2016   (IT) ...................... 102016000104377

(51) Int. Cl.
| | |
|---|---|
| *F16L 37/23* | (2006.01) |
| *F16L 37/10* | (2006.01) |
| *F16L 27/08* | (2006.01) |
| *F16L 3/00* | (2006.01) |
| *F16L 19/02* | (2006.01) |
| *F16L 15/04* | (2006.01) |

(52) U.S. Cl.
CPC ............ *F16L 37/101* (2013.01); *F16L 3/003* (2013.01); *F16L 19/0218* (2013.01); *F16L 27/0824* (2013.01); *F16L 27/0828* (2013.01); *F16L 37/23* (2013.01); *F16L 15/04* (2013.01)

(58) Field of Classification Search
CPC ......... F16L 37/101; F16L 37/22; F16L 37/23; F16L 37/53; F16L 27/0824; F16L 27/0828

USPC ............................ 285/18, 121.5, 121.3, 276
See application file for complete search history.

(56) References Cited

U.S. PATENT DOCUMENTS

| | | | | |
|---|---|---|---|---|
| 964,578 | A * | 7/1910 | Stephens | ............. F16L 27/0828 285/276 |
| 2,927,804 | A | 3/1960 | Snyder | |
| 3,512,540 | A * | 5/1970 | Hughes | ................. E04H 4/1681 134/167 R |
| 4,142,742 | A * | 3/1979 | Cornett | ................... F16L 39/04 285/121.3 |
| 4,905,965 | A * | 3/1990 | Dolev | ..................... F16L 37/22 251/149.9 |

(Continued)

FOREIGN PATENT DOCUMENTS

FR              1258308 A     4/1961

OTHER PUBLICATIONS

Italian Patent Office Search Report and Written Opinion dated Jun. 7, 2017 (partially in English).

(Continued)

*Primary Examiner* — Aaron M Dunwoody
(74) *Attorney, Agent, or Firm* — Hedman & Costigan, P.C.; James V. Costigan; Kathleen A. Costigan

(57) ABSTRACT

A connection device for pipes including a first hose-holder (18) mounted on an end portion (3) of the pipe, a second hose holder (16) mounted on the other end portion (6) of the same pipe and a connection element (15) for the connection of the first and second hose-holders (18,16). The connection element (15) consists of a substantially tubular body having a longitudinal hole (30), and a circulating ball portion (17) for the connection to one of the first hose-holder (18) or the second hose-holder (16).

6 Claims, 4 Drawing Sheets

(56) References Cited

U.S. PATENT DOCUMENTS

| | | |
|---|---|---|
| 2002/0121776 A1 | 9/2002 | Hendey |
| 2004/0041395 A1 | 3/2004 | Frost |
| 2004/0080160 A1* | 4/2004 | Rief ..................... E04H 4/1654 285/276 |
| 2012/0037245 A1* | 2/2012 | Eley ................... B65H 75/4478 137/355.26 |
| 2012/0139233 A1* | 6/2012 | Bohner ............... F16L 27/0828 285/272 |
| 2013/0118607 A1* | 5/2013 | Eley ................... B65H 75/4478 137/355.26 |

OTHER PUBLICATIONS

English Machine Translation of Description for FR 1258308 A dated Apr. 14, 1961.

* cited by examiner

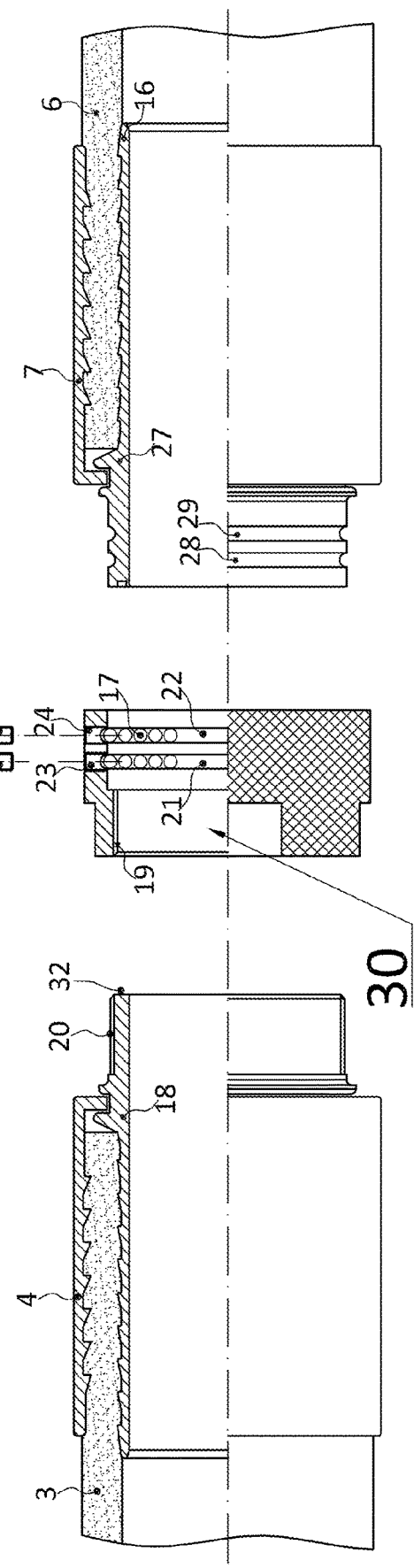

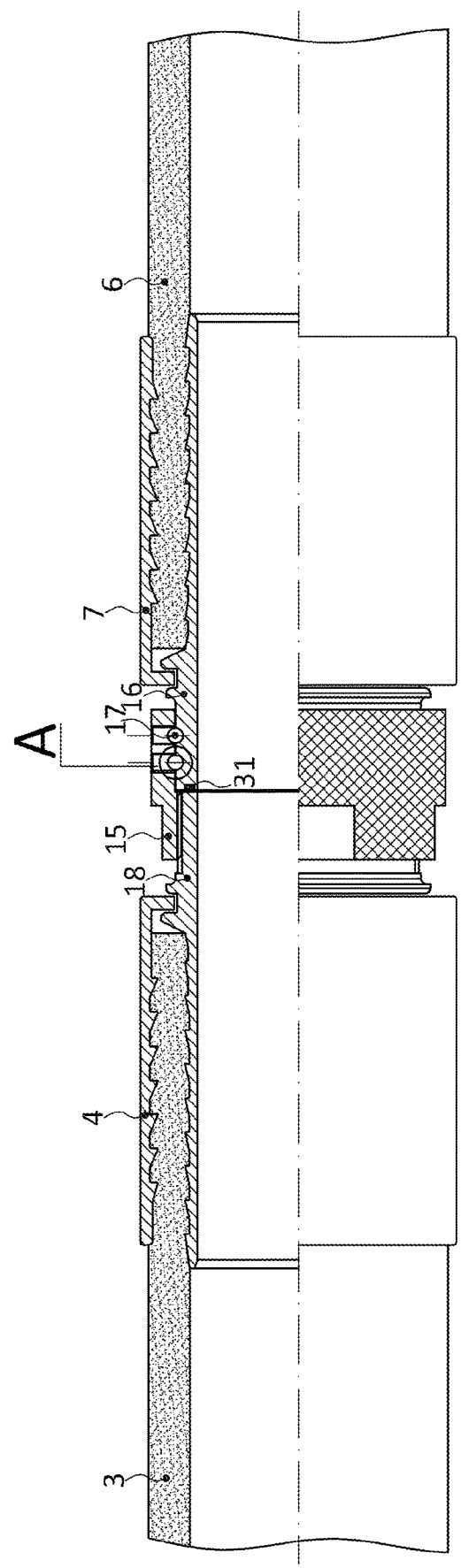

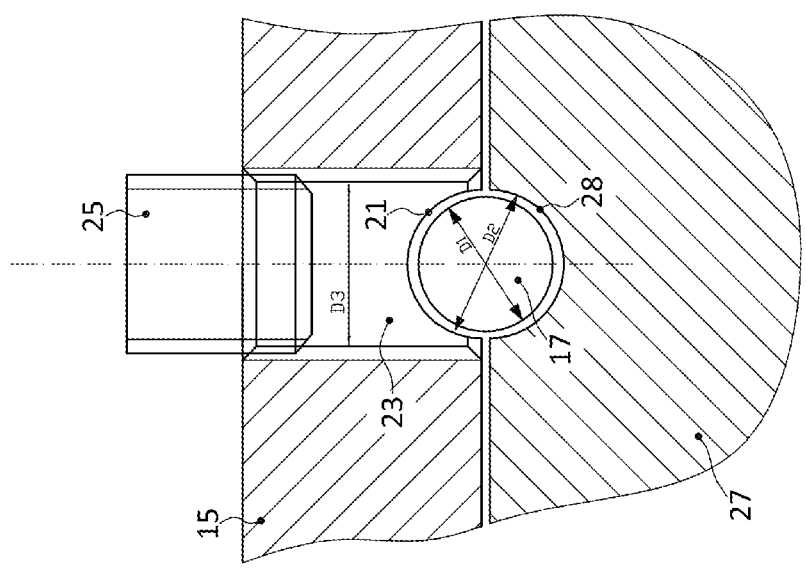

CONNECTION DEVICE FOR PIPES IN GENERAL

BACKGROUND OF THE INVENTION

The present invention relates to an improved connection device for pipes in general.

The field of the invention is that of pipes, in particular flexible hoses through which a pressurized fluid (for example, liquid cement) is circulated.

The traditional connection devices applied in this field have a threaded coupling, provided with an inner shoulder adapted for cooperating with a corresponding shoulder on the hose-holder (i.e. the fitting portion intended to be inserted into the corresponding end portion of the hose) and protruding towards the outside of the same hose-holder.

The conventional solution now described has the drawback that the shoulder on the hose-holder requires an enlargement or increase in diameter of the thread, which causes said shoulder to protrude above the outer surface of the hose-holder.

An increase in bulk at the connection portion of the hose ends is thus generated, which, for example, when winding up a large diameter hose (for example greater than 50 mm), can also cause breakage on the parts of the hose in contact with the protruding shoulder portion.

SUMMARY OF THE INVENTION

The main object of the present invention is to provide a connection device for end portions of hoses or pipes, which, compared with similar devices of the prior art, does not require increased thickness of the thread, while providing the desired mechanical sealing performance.

These and other objects are achieved with the device according to claim 1. Preferred embodiments of the invention are disclosed in the remaining claims.

With reference to the prior art described above, the device of the present invention offers the advantage of not requiring the use of threads having a shoulder protruding on the surface of the hose and capable of damaging the same.

BRIEF DESCRIPTION OF THE DRAWINGS

These and other objects, characteristics and advantages are apparent from the following description of a preferred embodiment of the device of the present invention illustrated, by way of non-limiting example, in the figures of the accompanying drawings.

Wherein:

FIG. 2 is an exploded and sectional view of the device of the invention;

FIG. 3 is a sectional view of the device of FIG. 2 in the assembled state of the two end portions of the hose; and FIG. 4 shows the detail A, enlarged, of FIG. 3.

DESCRIPTION OF PREFERRED EMBODIMENTS

Figure 1:
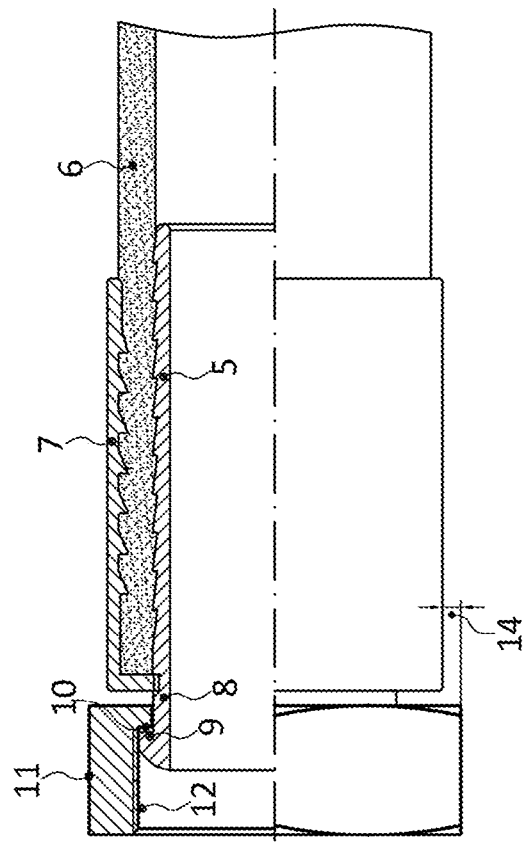
FIG. 1 is a sectional view of a threaded connection according to the prior art.

The threaded connection of the prior art, as shown in FIG. 1, is denoted as a whole by the reference numeral 1.

This comprises a first hose-holder 2 fitted into the end portion 3 of a corresponding flexible hose and locked therein by means of a pressing ring nut 4.

In the other end portion 6 of the hose a corresponding hose-holder 5 is in turn inserted, locked in position by means of a corresponding pressing ring nut 7.

At the outer end portion 8 of the hose-holder 5 a shoulder 9 is provided, protruding towards the outside of the same hose-holder and adapted to cooperate with a corresponding inner shoulder 10 of a threaded element 11.

The closure of the connection is made by coupling the inner thread 12 of the mentioned element 11 with the corresponding outer thread 13 of the hose-holder 2 applied to the other end portion of the hose.

The presence of the described outer shoulder 9 requires the threaded element 11 to be made with an increased thickness, such as to determine the formation of a protrusion or an increase in bulk 14 above the outer diameter of the pressing ring nut 7. When winding up the hose above the protrusion 14, especially in case of large size hoses, it is possible that breakage occurs on the surfaces of the hose that are in contact with the same protrusion.

In order to overcome these drawbacks, the device of FIG. 2 has been made, wherein a connection element 15 is used, formed by a substantially tubular body having a longitudinal hole 30. Said connection element 15 has a first portion provided with balls 17 to obtain the coupling to the corresponding hose-holder 16 mounted on the end portion 6 of the hose.

The same connection element 15 has, furthermore, a second portion provided with an inner thread 19 for the coupling to the corresponding outer thread 20 of the hose-holder 18 mounted on the other end portion 3 of the hose.

Advantageously, according to the present invention, the inner diameter of the hose-holder 16 is the same as the inner diameter of the hose-holder 18. In this way any head loss due to the presence of a change in the inner section of the duct can be nullified.

The balls 17 provided on said first portion of the connection element 15 are housed within semi-channels 21,22 provided on the inner wall of the same connection element 15 and are introduced from the outside into said semi-channels passing through holes 23,24 formed on the outer surface of said connection element 15, at the same semi-channels 21,22 and closed towards the outside by corresponding threaded caps 25,26.

At the end portion 27 of the hose-holder 16 semi-channels 28,29 are provided which, when the connection device is in use (FIG. 3), close on the balls 17 housed in said semi-channels 21,22 of the connection device element 15.

The diameter D1 of the balls 17 of FIG. 4 is less than the diameter D2 of the channel made by the described coupling of the semi-channels 21,28 and 22,29.

Said diameter D1 is thus smaller than the mentioned diameter D2 in a sufficient manner so as to allow the balls 17 to be housed in the mentioned channels and to allow the circulation of the same balls in the inside thereof.

At the same time, the diameter D1 of the balls 17 must also be large enough to achieve the necessary interference with the inner walls of said channels, so as to provide the spherical coupling with the necessary mechanical sealing. In this way any detachment in the axial direction between the connection element 15 and the end portion 27 of the hose-holder 16 is prevented from occurring.

For example, for hoses with an inner diameter of 76 mm the semi-channels 21,28:22,29 have a radius of 2.7 mm, in which balls 17 having a diameter of 5 mm engage.

Therefore, the coupling of the connection element 15 to the end portion 27 of the hose-holder 16 is obtained by inserting said end portion 27 into the hole 30 of the element 15, until the positions of the semi-channels 28,29 of the hose-holder 16 coincide with those of the semi-channels 21,22 of the element 15.

From this position, the mentioned ball 17 are inserted into the holes 23,24 of the same element 15 from the outside of the latter, thus allowing them to fall inside channels formed by the mutual coupling of said semi-channels 21,28 and 22,29.

The coupling is finally secured by closing the caps 25,26 inside the holes 23,24 preferably by means of corresponding threads. An O-ring 31 (shown in FIG. 3) is also provided at the abutment shoulder 32 to ensure the necessary hydraulic sealing between the hose-holder 18 and the end portion 27 of the hose-holder 16 (FIG. 4).

Pressing ring nuts 4,7 are finally provided on the corresponding end portions 3,6 of the hose associated with the respective hose-holders 18 and 16.

In this way the connection of the end portions 3 and 6 of the hose is obtained, as illustrated in FIG. 3.

Furthermore, the mentioned end portions 3 and 6 can be the end portions of a flexible hose, although the invention is not limited to this type of hose.

Finally, it should be noted that the opening of the connection, on the side of the ball 17 portion of said connection element 15, is obtained by extracting the caps 25,26 from the respective seats 23,24 so as to allow the balls 17 to be removed from the respective channels 21,28 and 22,29.

The invention claimed is:

1. A connection device for a flexible hose, comprising
   a first hose-holder (18) for being mounted on a first flexible hose end portion (3),
   a first pressing ring nut (4) adapted to mount said first hose-holder (18) on the first flexible hose end portion (3),
   a second hose-holder (16) for being mounted on a second flexible hose end portion (6),
   a second pressing ring nut (7) adapted to mount said second hose-holder (16) on the second flexible hose end portion (6), and
   a connection element (15) adapted to mutually connect said first and second hose-holders (16,18), said connection element (15) comprising a substantially tubular body having a longitudinal hole (30), a circulating ball portion (17) for connecting to said second hose-holder (16),
   wherein an inner diameter of said second hose-holder (16) is the same as an inner diameter of said first hose-holder (18), an outer diameter of said connection element (15) is smaller than an outer diameter of said first pressing ring nut (4), and said outer diameter of said connection element (15) is smaller than an outer diameter of said second pressing ring nut (7).

2. A connection device for a flexible hose, comprising
   a first hose-holder (18) for being mounted on a first flexible hose end portion (3),
   a first pressing ring nut (4) adapted to mount said first hose-holder (18) on the first flexible hose end portion (3),
   a second hose-holder (16) for being mounted on a second flexible hose end portion (6),
   a second pressing ring nut (7) adapted to mount said second hose-holder (16) on the second flexible hose end portion (6), and
   a connection element (15) adapted to mutually connect said first and second hose-holders (16,18), said connection element (15) comprising a substantially tubular body having a longitudinal hole (30), a circulating ball portion (17) for connecting to said second hose-holder (16),
   wherein an inner diameter of said second hose-holder (16) is the same as an inner diameter of said first hose-holder (18), an outer diameter of said connection element (15) is smaller than an outer diameter of said first pressing ring nut (4), and said outer diameter of said connection element (15) is smaller than an outer diameter of said second pressing ring nut (7), and
   wherein said connection element (15) further comprises a threaded portion (19) for connecting to a corresponding thread (20) of said first hose-holder (18).

3. A connection device according to claim 2, wherein said circulating ball portion comprises semi-channels (21,22) for housing balls (17), and holes (23,24) for inserting said balls (17) into said semi-channels (21,22) which are releasably closed by means of corresponding threaded caps (25,26).

4. A connection device according to claim 3, wherein said second hose-holder (16) has an end portion (27) that protrudes from the second flexile hose end portion (6) and having semi-channels (28,29) cooperating with the semi-channels (21,22) of the ball portion (17) of said connection element (15) to form, when a connection is obtained, respective channels (21,28) and (22,29) for containing and circulating said balls (17) in a clamping position of said end portion (27) of the second hose-holder (16) within the circulating ball portion (17) of the connection element (15).

5. A connection device according to claim 4, wherein said balls (17) have a diameter (D1) which is smaller than a diameter (D2) of the channels (21,28;22,29), but large enough to obtain a mechanical seal of a coupling between said circulating ball portion of the connection element (15) and the end portion (27) of the second hose-holder (16), with the balls (17) being free to circulate within said channels while any detachment in an axial direction between the connection element (15) and said end portion (27) of the second hose-holder (16) is prevented.

6. A connection device according to claim 5, further comprising an O-ring (31) arranged at an abutment shoulder (32) of the first hose-holder (18) which ensures a hydraulic sealing between the first hose-holder (18) and said end portion (27) of the second hose-holder (16).

* * * * *